United States Patent [19]
Hamada et al.

[11] Patent Number: 6,110,549
[45] Date of Patent: *Aug. 29, 2000

[54] SEALANT RESIN COMPOSITION FOR USE IN RETORT FILM AND SEALANT FILM

[75] Inventors: Naoshi Hamada; Sadamu Hirakawa; Shigeo Ozaki, all of Ichihara, Japan

[73] Assignee: Mitsui Chemicals Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/070,020

[22] Filed: Apr. 30, 1998

[30] Foreign Application Priority Data

Apr. 30, 1997 [JP] Japan ................................. 9-112752

[51] Int. Cl.$^7$ ..................................... B29D 22/00
[52] U.S. Cl. ...................... 428/35.2; 428/35.7; 428/35.8; 428/461; 428/476.9; 428/483; 525/236; 525/240; 525/242; 525/244; 525/245
[58] Field of Search ..................................... 428/500, 521, 428/35.2, 35.7, 35.8, 461, 476.9, 483; 525/236, 240, 242, 244, 245

[56] References Cited

FOREIGN PATENT DOCUMENTS

| | | |
|---|---|---|
| 0688819 | 12/1995 | European Pat. Off. . |
| 8269257 | 10/1996 | European Pat. Off. . |
| 0791626 | 8/1997 | European Pat. Off. . |

OTHER PUBLICATIONS

Derwent Patent Abstract of JP 08269257.

Primary Examiner—Leszek Kiliman

[57] ABSTRACT

A sealant resin composition for retort packaging film comprises a high density polyethylene as the main resin component and a linear low density polyethylene polymerized by use of the metallocene catalyst. A sealant film produced therefrom is resistant to whitening, heat fusion, heat deformation after being subjected to boiling sterilization treatment and prevent breakage of pouches produced therefrom even at low temperatures because of its high impact strength and heat sealing strength.

11 Claims, No Drawings

SEALANT RESIN COMPOSITION FOR USE IN RETORT FILM AND SEALANT FILM

BACKGROUND OF THE INVENTION

1. Field of The Invention

The present invention relates to a sealant resin composition for use in the manufacture of pouches for retort packages and a sealant film.

2. Description of the Background

In recent years, the demand for retort food has grown rapidly with the development of the food service industry, and along with this, there has been increasingly severe requirements imposed on the performance of pouches for packaging retort food. Pouches are generally formed in the form of bag by using aluminum foil or film with gas barrier properties as the substrate layer and a sealant film laminated to the substrate layer, with its circumference heat-sealed. Up to the present, polypropylene having a high melting point and therefore being heat resist has been used exclusively for the material of the sealant so that such pouches will withstand the boiling conditions at the time of retort treatment for sterilization.

However, the recent trend is toward increasing the quantities, in volume or number, of contents of pouches, resulting in an increase in the size of pouches and the weight of the contents. The trend is also toward storing and distributing retort food in a frozen state. This change in the environment surrounding retort food has given rise to the necessity for increasing the mechanical strength—particularly pouch breakage resistance—in low-temperature storage. However, the conventional polypropylene sealant layer is unable to meet this requirement for higher strength at low temperatures.

On the other hand, the use of high density polyethylene in the sealant layer improves the impact resistance at low temperatures and prevents pouches from being broken due to a drop accident of frozen food, among other things. However, since high density polyethylene does not have adequate heat resistance, problems will arise, including heat fusion, heat deformation, a decline in transparency due to whitening and breakage of the sealing section, when high density polyethylene pouches are subjected to boiling or retort treatment at 100° C. to 125° C. This makes the practical use of high density polyethylene pouches difficult.

It is stated in the Laid-open Patent Publication 3383/1996 that it is possible to obtain a sealant film exhibiting excellent extrudability, heat resistance and low-temperature impact resistance by compounding a small amount of high density polyethylene with ethylene-a-olefin copolymer. However, the sealant film having a high low-density component content does not show adequate whitening resistance, deformation resistance or heat fusion performance when it is boiled at high temperatures.

SUMMARY OF THE INVENTION

With the aim of resolving the above problems, the primary object of the present invention is to provide a sealant resin composition that has excellent low-temperature impact resistance.

Another object is to provide a sealant resin composition that has high-temperature transparency and excellent resistance to heat fusion, resistance to heat deformation and sealing strength.

The third object is to provide a sealant film that possesses the aforementioned properties.

Other and further objects, features and advantages of the present invention will appear more fully from the following description.

According to the present invention, the resin composition for the sealant for retort film comprises (A) 55 to 95 parts by weight of a high density polyethylene having a density of 0.945 to 0.970 g/cm$^3$ and a melt flow rate of 0.5 to 10 g/10minutes and (B) 5 to 45 part by weight of a linear low density polyethylene prepared by use of a metallocene catalyst which has a density of 0.890 to 0.925 g/cm$^3$ and a melt flow rate of 0.5 to 10 g/10 minutes [a total amount of (A) and (B) is 100 parts by weight].

In the present invention, a resin composition is preferable, out of such resin compositions, which is able to form a film that has a film impact strength at −5° C. of not less than 1,200 kg.cm/cm, shows haze of not more than 5.5% after being subjected to boiling treatment at 120° C. for 1,800 seconds and has the sealing section showing a tensile strength at break (sealing strength) at −20° C. of not less than 20N/15 mm and a tensile elongation at break (sealing elongation) at −20° C. of not less than 200%.

Furthermore, the sealant film for retort film to which the present invention relate is a film formed from the sealant resin composition for retort film to which the present invention relates.

In the present invention, a film is preferable, out of such films, which has a film impact strength at −5° C. of not less than 1,200 kg.cm/cm, shows haze of not more than 5.5% after being subjected to boiling treatment at 120° C. for 1,800 seconds and has the sealing section showing a tensile strength at break (sealing strength) at −20° C. of not less than 20N/15 mm and a tensile elongation at break (sealing elongation) at −20° C. of not less than 200%.

DETAILED DESCRIPTION OF THE PREFERRED EMBODIMENTS

High Density Polyethylene (A)

The high density polyethylene (A) that is the main component of the sealant resin composition and sealant film to which the present invention relates has the density and melt flow rate as described below.

The high density polyethylene (A) has the density of 0.945 to 0.970 g/cm$^3$, preferably 0.945 to 0.965 g/cm$^3$, more preferably 0.950 to 0.960 g/cm$^3$ as determined by a method based on ASTM D-1505. A composition from which a film showing a high deformation starting temperature (Td) and high transparency may be formed can be obtained by using the high density polyethylene whose density is in the range. The use of a composition like this, including the high density polyethylene (A) makes it possible to raise the heating sterilization treatment temperature and shorten heating sterilization treatment time.

Moreover, this high density polyethylene (A) has a melt flow rate (MFR) of 0.5 to 10 g/10 minutes, preferably 0.5 to 8 g/10 minutes, more preferably 1.0 to 6.0 g/10 minutes as determined by a method based on ASTM D-1238 (temperature: 190° C.; load: 2.16 kg). The polyethylene resin composition that may be obtained from such high density polyethylene having a melt flow rate in such range will have good film formability and good extrudability when used by the blown film forming method with air cooling and provide a film having a good balance of strength between machine and transverse directions.

Linear Low Density Polyethylene (B)

The linear low density polyethylene (B) used in the present invention is an ethylene homopolymer or a copolymer of ethylene and an α-olefin, preferably an α-olefin having 3 to 12 carbon atoms.

Specific examples of an α-olefin having 3 to 12 carbon atoms include propylene, 1-butene, 1-pentene,1-hexene, 4-methyl-1-pentene, 1-heptene, 1-octene, 1-nonene, 1-decene, 1-undecene and 1-dodecene. The α-olefin may be copolymerized singly or in combination of two or more kinds of them with ethylene.

The linear low density polyethylene (B) is preferably ethylene/1-butene copolymer, ethylene/1-hexene copolymer, ethylene/4-methyl-1-pentene copolymer or ethylene/1-octene copolymer.

This linear low density polyethylene (B) has an ethylene content of 95 to 99 mol %, preferably 96 to 98 mol % and a comonomer α-olefin content of 1 to 5 mol % and preferably 2 to 4 mol %. Linear low density polyethylene whose ethylene and α-olefin contents are within the above ranges provides a film having heat resistance and excellent mechanical strength such as impact resistance.

The composition of linear low density polyethylene is determined by the method as described below.

The recurring unit or monomer content constituting the linear low density polyethylene (B) can be determined by measuring a $^{13}$C-NMR spectrum in the following manner. In a sample tube having a diameter of 10 mm, about 200 mg of a sample of the linear low density polyethylene is homogeneously dissolved in 1 ml of hexachlorobutadiene, and a $^{13}$C-NMR spectrum of the solution is measured under the conditions of a temperature of 120° C., a frequency of 25.05 MHz, a spectral width of 1,500 Hz, a pulse repetition time of 4.2 sec and a pulse width of 6 μsec.

The linear low density polyethylene (B) has a density in the range of 0.890 to 0.925 g/cm$^3$, preferably 0.895 to 0.925 g/cm$^3$, more preferably 0.895 to 0.920 g/cm$^3$ as determined by a method based on ASTM D-1505. As long as the density of the polyethylene (B) is within the aforementioned range, the main chains of the polyethylene may contain branches of short or long chains, and the polyethylene resin composition provides a film having excellent mechanical strength such as impact resistance.

Furthermore, the melt flow rate (MFR) of this linear low density polyethylene is in the range of 0.5 to 10 g/10 minutes, preferably 0.5 to 8 g/10 minutes, more preferably 1.0 to 8.0 g/10 minutes as determined by a method based on ASTM D-1238 (temperature: 190° C.; load: 2.16 kg). If the melt flow rate of the polyethylene (B) is within the aforementioned range, it provides a resin composition having suitable extrudability and a film having high heat- sealing strength.

It is desirable that the value (Mw/Mn) which is divided of the weight-average molecular weight (Mw) by the number-average molecular weight (Mn), which is an index of the molecular weight distribution of the linear low density polyethylene (B) may be 1.5 to 3.5. The weight-average molecular weight (Mw) and the number-average molecular weight (Mn) are determined by the GPC method using o-dichlorobenzene as a carrier at a column temperature of 140° C. The polyethylene (B) whose Mw/Mn is within this range, indicating that the low molecular weight component content of the polyethylene (B) is low, is suitable for use as the resin component for the inner side of a package.

The linear low density polyethylene (B) can be prepared by homopolymerizing ethylene or copolymerizing ethylene and an α-olefin in having 3 to 20 carbon atoms in the presence of a single site olefin polymerization catalyst, for example, a metallocene type olefin polymerization catalyst containing a metallocene catalyst component as disclosed in U.S. Pat. No. 5,459,217, U.S. Pat. No. 5,371,146, or U.S. Pat. No. 5,464,905, all of which are incorporated herein by reference, and also disclosed in Japanese Laid-Open Patent Publication No. 136196/1994.

The aforementioned metallocene type catalyst is generally formed from (a) a metallocene catalyst component comprising a Group IVB transition metal compound containing at least one ligand having cyclopentadienyl skeleton, (b) an organoaluminum oxy-compound catalyst component, optionally (c) a fine particle carrier, (d) an organoaluminum compound catalyst component and (e) an ionizing ionic compound catalyst component.

Examples of the metallocene catalyst component (a) preferably used in the present invention include a Group IVB transition metal compound containing at least one ligand having cyclopentadienyl skeleton. As the transition metal compound, a compound represented by the following formula [I], for example, may be cited:

$$ML^1x \qquad [I]$$

wherein x is a valence of a transition metal atom M.

M is a transition metal atom selected from Group IVB of the periodic table, specifically zirconium, titanium or hafnium. Of these, zirconium is preferable.

$L^1$ is a ligand coordinated to the transition metal atom M. At least one ligand $L^1$ is a ligand having cyclopentadienyl skeleton, and a substituent such as halogen atom or trialkylsilyl group may be attached to the cyclopentadienyl group.

When the compound represented by formula [I] contains two or more groups having cyclopentadienyl skeleton, two of them may be bonded to each other through an alkylene group such as methylene, ethylene or propylene, its substituted alkylene group, a silylene group, or a substituted silylene group such as a dimethylsilylene group or a diphenylsilylene group.

Ligands $L^1$other than ligand having cyclopentadienyl skeleton may be an alkyl group such as methyl, ethyl, propyl or butyl, a cycloalkyl group such as cyclopentyl, an aryl group such as phenyl, an aralkyl group such as benzyl, an alkoxy group,an allyloxy group, trialkylsilyl group, hydrocarbon group having a sulfonate group, halogen atom or hydrogen atom.

Examples of ligands $L^1$ include specifically alkyl-substituted cyclopentadienyl groups such as a cyclopentadienylgroup, a methylcyclopentadienyl group, an n-butylcyclopentadienyl group, a dimethylcyclopentadienyl group, a trimethylcyclopentadienyl group, a tetramethylcyclopentadienyl group, a pentamethylcyclopentandienyl group, a methylethylpentadienyl group and a hexylcyclopentadienyl group, an indenyl group, a 4,5,6,7-tetrahydroindenyl group, and a fluorenyl group.

As the organoaluminum oxy-compound catalyst component (b), aluminoxane which is obtained by reacting an alkylaluminum compound with water is used preferably. Aluminoxane is a compound containing 3 to 50 repeating units represented by the general formula —Al(R)O— (wherein R is an alkyl group), and methylaluminoxane, ethylaluminoxane,methylethylaluminoxane, etc. are used for aluminoxane.

The fine particle carrier (c) optionally used in the preparation of the olefin polymerization catalyst is an inorganic or organic compound. It is also a particulate or granular solid having a particle (or granule) size of preferably 20 to 200 μm. Examples of a porous inorganic oxide carrier that is widely used include $SiO_2$, $Al_2O_3$, $MgO$, $ZrO_2$, $TiO_2$, $Cao$, $ZnO$, $BaO$ and $SnO_2$.

Examples of the organoaluminum compound catalyst component (d) used in the preparation of the olefin polymerization catalyst include trialkylaluminums such as trimethylaluminum triethylaluminum and triisobutylaluminum, alkenylaluminums such as isoprenylaluminum, dialkylaluminum halides such as dimethylaluminum chloride and diethylaluminum chloride, and alkylaluminum sesquihalides such as methylaluminum sesquichloride.

Examples of the ionizing ionic compound catalyst component (e) include Lewis acid such as triphenylboron, $MgCl_2$ and $Al_2O_3$, ionic compounds such as triphenylcarbeniumtetrakis(pentafluorophenyl)borate, and carborane compounds, such as bis-n-butylammonium(1-carbedodeca)borate.

It is desirable that the atom ratio (Al/M) between the aluminum atom (Al) deriving from the component (b) and the component (c) and the transition metal atom (M) deriving from the component (a) may be in the range of 5 to 300, preferably 10 to 200.

As examples of another olefin polymerization catalyst different from the aforementioned catalyst, (4-methylphenylamide)dimethyl(tetramethyl-$\eta^5$-cyclopentadienyl)-silane-titanium dichloride,(t-butylamide) dimethyl-(tetramethyl-$\eta^5$-cyclopentadienyl)silane-zirconium dimethyl, for example, may be cited. These compounds are coordinated metal complexes having condensed rings formed from metal such as titanium or zirconium, cyclopentadienyl group, ligand group, etc. This olefin polymerization catalyst is disclosed in Japanese Patent Publication No. 2623070.

The linear low density polyethylene (B) used in the present invention can be obtained by homopolymerizing ethylene or copolymerizing ethylene and an α-olefin under various conditions in the gas phase or the slurry or solution phase in the presence of a catalyst, such as the aforementioned metallocene catalyst. In the slurry or solution polymerization process, an inert hydrocarbon or the olefin itself may be used as the solvent or medium.

In the preparation of the linear low density polyethylene (B), such process may be adopted as (1) multi-stage gas or liquid polymerization process, (2) multi-stage process of polymerization in the liquid and gas phases or (3) process of gas-phase polymerization after prepolymerization in the liquid phase.

Since the catalyst used in the production of the linear low density polyethylene (B) has a single polymerization activity site on its surface, the polyethylene (B) has a narrow molecular weight distribution as described above and practically uniform composition distribution between ethylene and α-olefin.

Sealant Resin Composition

The resin composition for the sealant for retort film comprises the aforementioned high density polyethylene (A), linear low density polyethylene (B), and optionally other components.

The compounding ratio of the high density polyethylene (A) to the linear low density polyethylene (B) is 55 to 95, preferably 60 to 90, more preferably 60 to 85 parts by weight, of the high density polyethylene (A) 5 to 45, preferably 10 to 40, more preferably 15 to 40 parts by weight of the linear low density polyethylene (B) against a total quantity of 100 parts of (A) and (B) combined.

The film obtained by compounding the high density polyethylene (A) with the linear low density polyethylene (B) at such ratio shows not only less haze, that is, improved transparency, but also increased flexibility and a less degree of decline in impact strength.

If the linear low density polyethylene prepared in the presence of the Ti-based Ziegler catalyst conventionally used in the past is used in place of the linear low density polyethylene (B) prepared in the presence of the metallocene catalyst, the film comprising a composition containing the high density polyethylene will certainly show an improvement in transparency but a large decline in impact strength at the same time.

The sealant resin composition for retort film may be compounded as required with proper amounts of additives such as an anti-oxidant, heat stabilizer, antistatic agent, antislipping agent, antiblocking agent, antifogging agent, lubricant, pigment, dye, nucleating agent, plasticizer, anti-aging agent, hydrochloride absorber, weathering stabilizer to such an extent that the object of the present invention will not be frustrated. Furthermore, the sealant resin composition may be blended with a small amount of another polymer compound in either resin or elastomer state unless it departs from the object of the present invention.

The sealant resin composition for retort film may be manufactured from the high density polyethylene (A) and the linear low density polyethylene (B) by using a conventional method. Specifically, the following methods may be used, for example:

(1) The method in which the high density polyethylene (A), the linear low density polyethylene(B), and optionally other components to be added are blended by the dry blending method using the Henschel mixer, the mechanical melt blending method using such means as an extruder, kneader, etc. and the blending method combining these methods.

(2) The method in which the high density polyethylene (A), the linear low density polyethylene (B) and other components to be added as required are dissolved in an appropriate good solvent (a hydrocarbon solvent such as hexane, heptane, decane, cyclohexane, benzene, toluene or xylene, for example), and then the solvent is removed from the solution.

(3) The method in which each of the high density polyethylene (A), the linear low density polyethylene (B), and optionally other components to be added are separately dissolved in an appropriate good solvent to prepare respective solutions, these solutions are mixed, and then the solvent is removed from the mixed solutions.

(4) The method in which the methods (1) through (3) above are used in combination with one another.

In addition to the aforementioned methods, it is also possible to manufacture the sealant resin composition by the method as described below.

For example, it is possible to manufacture the sealant resin composition by polymerizing the linear low density polyethylene (B) and the high density polyethylene (A) in two separate stages of polymerization under different conditions using one reactor. Specifically, this method employs a two-stage polymerization process in which the linear low density polyethylene (B) is polymerized in the first stage and the high density polyethylene(A) is polymerized in the second stage; or the high density polyethylene (A) is polymerized in the first stage and the linear low density polyethylene (B) is polymerized in the second stage.

It is also possible to manufacture the sealant resin composition by polymerizing the linear low density polyethylene (B) in one reactor and polymerizing the high density polyethylene (A) in the presence of the linear low density polyethylene (B) in another reactor or by polymerizing the high density polyethylene (A) in one reactor and polymerizing the linear low density polyethylene (B) in the presence of the high density polyethylene (A) in another reactor. Or it is also possible to manufacture the sealant resin composition by polymerizing the high density polyethylene (A) and the linear low density polyethylene (B) each in separate reactors and blending them.

Sealant Film

The sealant film for retort film to which the present invention relates is manufactured from a composition comprising the aforementioned high density polyethylene (A) and linear low density polyethylene (B). This sealant film can be molded by the blown-film extrusion method or the T-die extrusion method, and the thickness of the film is 10 to 100 μm, preferably 30 to 80 μm.

The formation of the film by the blow-film extrusion method (inflation method) is accomplished by extruding the raw material resin composition through a circular die at a resin temperature of 190° C. to 250° C. and inflating the extrudate under air pressure.

The formation of the film by the T-die extrusion method is accomplished by extruding the raw material resin composition in a melted state through a T die and taking up the extruded film. For example, the film may be extruded by use of the Toshiba Unimelt extruder (diameter: 65 mm) with a T die 600 mm wide at the resin temperature of 230° C. and resin pressure of 180 kg/cm$^2$ and taken up at a rate of 20 m/min.

A preferable example of the sealant film for retort film is a film having a film impact strength at −5° C. (as determined by use of a film impact strength tester of Toyo Seiki Seisakusho, Ltd.) (as determined by the method based on ASTM D 1003-61) of not less than 1,200 kg.cm/cm, for example 1,200~7,000 kg.cm/cm, a haze of not more than 5.5%, for example 1~5.5%, after being subjected to boiling treatment at 120° C. for 1,800 seconds, a tensile strength at break at −20° C. of not less than 20N/15 mm, for example 20~50 N/15mm, and a tensile elongation at break at −20° C. of not less than 200%. The film showing greater tensile elongation at break absorbs readily impact to a greater extent and exhibits higher low-temperature impact resistance.

The tensile strength at break and tensile elongation at break are measured by conducting tensile test in an atmosphere at −20° C. by using a tensile tester of the constant crosshead speed type (available from Instron Co.) after the film is heat-sealed on NEWLONG HS-330 Top Sealer (trade name: available from Tester Sangyo K.K.) The heat sealing in this case may be carried out at a sealing temperature of 130° C., a sealing time of 1 sec and sealing pressure of 0.2 MPa.

Retort Film

The sealant film thus formed is laminated with the substrate to form retort film, and a retort pouch can be made by cutting out a piece of the retort film in an given form and heat-sealing the circumference of the cut-out film.

Examples of the substrate used in the retort film include metal foil such as aluminum foil or single- or multi-layer polymer films, having excellent gas barrier properties, of metallized film, polyethylene terephthalate, polyamide, ethylene-vinyl alcohol copolymer, polyvinylidene chloride, etc. The polymer films may be in either biaxially-oriented, monoaxially-oriented or unstretched state.

Retort film may be manufactured by extrusion-laminating the sealant resin composition directly into a form of film on the substrate or by dry-laminating the aforementioned sealant film with the substrate by means of an anchor coating agent. The thickness of the sealant film layer in this case has only to be such extent that it will show adequate heat sealing strength at the time of the manufacture of pouches. The thickness has 10 to 100 μm, preferably 30 to 80 μm.

Laminated structures such as polyamide film/sealant film and polyethylene terephthalate film/sealant film may be cited as examples of the layer structure of a retort pouch of the transparent type.

Furthermore, laminates structures such as aluminum foil/sealant film, polyethylene terephthalate film/aluminum foil/sealant film and polyethylene terephthalate film/polyamide film/aluminum foil/sealant film can be cited as examples of the layer structure of a retort pouch having aluminum foil.

Effect of the Invention

The sealant resin composition for retort film to which the present invention relates makes it possible to form a sealant film for retort film having not only excellent low-temperature impact strength but also excellent high-temperature transparency, heat fusion resistance, heat deformation resistance and sealing strength properties.

The sealant film for retort film to which the present invention relates comprises the aforementioned composition, and accordingly has not only excellent low-temperature impact strength but also excellent high-temperature transparency, heat fusion resistance, heat deformation resistance and sealing strength properties. Therefore, the retort pouches using the sealant film of the present invention prevent the occurrence of the whitening of the sealing surface (a decline in transparency), heat fusion, heat deformation and seal breakage even if they have been subjected to heating sterilization treatment at 100° C. to 125° C. and also prevent the occurrence of pouch breakage even when they are dropped in an atmosphere at −5° C.

Consequently, the sealant resin composition for retort film and sealant film, of the present invention, which have the effects as described above and are suitable for such applications as retort food packaging containers including large retort pouches for business use and medical containers including blood transfusion bags.

In the following examples are described several preferred embodiments to illustrate the present invention. However, it is to be understood that the invention is not intended to be limited to the specific embodiments.

Further, the testing methods for the physical properties of the sealant films obtained in the Examples and the Comparative Examples are as follows:

(1) Film impact strength at −5° C. (low-temperature impact strength):

The film impact strength at −5° C. was determined by use of a film impact tester of Toyo Seiki Seisakusho K.K.

(2) Haze (transparency):

The haze of the sealant film before and after it was subjected to boiling treatment at 120° C. for 1,800 seconds was determined in accordance with ASTM D 1003-61.

(3) Tensile strength at break and tensile elongation at break (sealing strength properties):

The tensile strength at break and tensile elongation at break were determined by conducting tensile test on the film in an atmosphere at −20° C. by use of a tensile tester of the constant crosshead speed type (available from Instron Co.) after heat-sealing the film by means of NEWLONG HS-330 Top Sealer (trade name: available from Tester Sangyo K.K.)

The resins contained in Table 1 were obtained by the following methods:

(1) High density polyethylene (HDPE):

The HDPE resin was manufactured by the low pressure polymerization process using the Ziegler catalyst.

(2) Linear low density polyethylene [L-LDPE (1) through (4)]:

The L-LDPE resins were manufactured by polymerizing ethylene and 1-octene or 1-hexene in the gas phase in the presence of the metallocene catalyst prepared from bis(1,3-dimethyl cyclopentadienyl) zirconiumdichloride, methylaluminoxane and triisobutyl aluminum.

(3) Linear low density polyethylene[L-LDPE (5)]:
L-LDPE (5) is a polyethylene resin obtained by polymerizing ethylene and 4-methyl-1-pentene in the presence of the Ziegler catalyst.

(4) Polypropylene (PP):
PP was obtained by homopolymerizing propylene in the presence of the Natta catalyst.

TABLE 1

| | Comonomer | | Density | MFR | |
|---|---|---|---|---|---|
| | Type | Contents (mol %) | (g/cm$^3$) | (g/10 min) | Mw/Mn |
| High density polyethylene | | | | (*1) | |
| HDPE | Propylene | 2.0 | 0.953 | 1.0 | |
| Linear low density polyethylene | | | | (*1) | |
| L-LDPE (1) | 1-octene | 8.5 | 0.895 | 4.0 | 2.1 |
| L-LDPE (2) | 1-hexene | 6.0 | 0.905 | 4.0 | 2.1 |
| L-LDPE (3) | 1-hexene | 3.5 | 0.915 | 4.0 | 2.1 |
| L-LDPE (4) | 1-hexene | 3.0 | 0.920 | 4.0 | 2.1 |
| L-LDPE (5) | 4-MP-1 | 1.2 | 0.940 | 2.0 | 2.4 |
| Polypropylene | | | | (*2) | |
| PP | — | — | 0.910 | 1.0 | |

*1 Determination was made in accordance with ASTM D-1238 (temperature: 190° C.; load: 2.16 kg).
*2 Determination was made in accordance with ASTM D 1238 (temperature: 230° C.; load: 2.16 kg).

EXAMPLES 1 THROUGH 4

The high density polyethylene prepared by the low pressure polymerization process using the Ziegler catalyst and linear low density polyethylene prepared in the presence of the metallocene catalyst, which are shown in Table 1, were blended in the ratio shown in Table 2 by means of a Henschel mixer, and the blend thus obtained was melt blended and pelletized by use of an extruder.

Further, the resin composition (I) was molded by the casting method under the following molding conditions, and a film 60 μm in thickness and 400 mm in width was obtained:

Molding conditions:
Molding machine: Unimelt 65 mm Ø casting equipment available from Toshiba Machine Co.
Die: 500 mm in diameter
Molding temperature: Cylinder 200° C., die 210° C.
Take-up speed: 20 m/min.

The film impact strength, haze, tensile strength at break and tensile elongation at break at the sealing section of the film obtained as described above were determined by the method mentioned above. The results of the determination are shown in Table 2.

Comparative Example 1

The physical properties were determined in the same manner as described in Example 1 except that the film 60 μm in thickness made of the polypropylene shown in Table 1 was used in place of the resin composition (I) in Example 1. The results of the determination are shown in Table 2.

Comparative Example 2

The physical properties were determined in the same manner as described in Example 1 except that the film 60 μm in thickness made of the linear low density polyethylene [L-LDPE (5)] shown in Table 1 was formed and used in place of the resin composition (I) in Example 1. The results of the determination are shown in Table 2.

Comparative Example 3

The physical properties were determined in the same manner as described in Example 1 except that the film 60 μm in thickness made of the high density polyethylene (HDPE) shown in Table 1 was formed and used in place of the resin composition (I) in Example 1. The results of the determination are shown in Table 2.

Comparative Example 4

The physical properties were determined in the same manner as described in Example 1 except that the film 60 μm in thickness made of the linear low density polyethylene [L-LDPE (1)] shown in Table 1 was formed and used in place of the resin composition (I) in Example 1. The results of the determination are shown in Table 2.

Comparative Example 5

The physical properties were determined in the same manner as described in Example 1 except that the film 60 μm in thickness made of a blend of the high density polyethylene and linear low density polyethylene [L-LDPE (2)] shown in Table 1 was formed and used in place of the resin composition (I) in Example 1. The results of the determination are shown in Table 2.

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Composition of Resin (parts by weight) | | | | | | | | | |
| HDPE | 70 | 70 | 70 | 70 | — | — | 100 | — | 30 |
| L-LDPE (1) | 30 | — | — | — | — | — | — | 100 | — |
| L-LDPE (2) | — | 30 | — | — | — | — | — | — | 70 |
| L-LDPE (3) | — | — | 30 | — | — | — | — | — | — |
| L-LDPE (4) | — | — | — | 30 | — | — | — | — | — |
| L-LDPE (5) | — | — | — | — | — | 100 | — | — | — |
| PP | — | — | — | — | 100 | — | — | — | — |

TABLE 2-continued

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Physical properties of film Haze (%) | | | | | | | | | |
| Before 120° C. boiling | 4.4 | 3.5 | 2.9 | 3.5 | 4.4 | 5.2 | 7.7 | 2.8 | 3.0 |
| After 120° C. boiling | 4.2 | 4.7 | 5.4 | 4.7 | 7.0 | 20.0() | 15() | 13() | 15() |
| Impact strength (kg · cm/cm)(−5° C.) | 1600 | 1350 | 1280 | 1300 | 600 | 900 | 1100 | 2000 | 1800 |
| Deformation after boiling | | | | | | | | | |
| 100° C. | Nil | Nil | Nil | Nil | Nil | Nil | Nil | Some* | Some* |
| 110° C. | Nil | Nil | Nil | Nil | Nil | A little | A little | Some* | Some* |
| 120° C. | Nil | Nil | Nil | Nil | Nil | Some* | Some* | Some* | Some* |
| Fusion after boiling | | | | | | | | | |
| 100° C. | Nil | Nil | Nil | Nil | Nil | Nil | Nil | Some* | Some* |
| 110° C. | Nil | Nil | Nil | Nil | Nil | Nil | Nil | Some* | Some* |
| 120° C. | Nil | Nil | Nil | Nil | Nil | Some* | Nil | Some* | Some* |
| Sealing strength (−20° C.)[N/15 mm] | 24.1 | 22.1 | 22.8 | 22.3 | 11.2 | 23 | 24 | 26 | 25 |
| Seal elongation (−20° C.) | 300 | 300 | 300 | 300 | 15 | 200 | 15 | 300 | 300 |

*The original form is lost due to deformation.
**Whitening occurred.

What we claim is:

1. A sealant resin composition useful for retort film comprising:

(A) 60 to 90 parts by weight of high density polyethylene having a density of 0.945 to 0.970 g/cm$^3$ and a melt flow rate of 0.5 to 10 g/10 minutes, as measured at a temperature of 190° C., and a load of 2.16 kg, according to the method of ASTM D-1238; and, (B) 10 to 40 parts by weight of linear low density polyethylene prepared by using a metallocene catalyst, and having a density of 0.890 to 0.925 g/cm$^3$ and a melt flow rate of 0.5 to 10 g/10 minutes as measured at a temperature of 190° C., and a load of 2.16 kg, according to the method of ASTM D-1238, wherein the total amount of (A) and (B) is 100 parts by weight.

2. A sealant film useful for sealing a retort film, said sealant film formed from a resin composition comprising:

(A) 60 to 90 parts by weight of high density polyethylene having a density of 0.945 to 0.970 g/cm$^3$ and a melt flow rate of 0.5 to 10 g/10 minutes, as measured at a temperature of 190° C., and a load of 2.16 kg, according to the method of ASTM D-1238; and, (B) 10 to 40 parts by weight of linear low density polyethylene prepared by using a metallocene catalyst, and having a density of 0.890 to 0.925 g/cm$^3$ and a melt flow rate of 0.5 to 10 g/10 minutes as measured at a temperature of 190° C., and a load of 2.16 kg, according to the method of ASTM D-1238, wherein the total amount of (A) and (B) is 100 parts by weight.

3. A retort film suitable for making retort pouches comprising the sealant film according to claim 2 laminated to a substrate comprising a polyamide film, polyester film or aluminum foil.

4. A retort pouch obtained by forming the retort film of claim 3 into a pouch with the sealant film side of the retort film is in contact with itself and heat-sealing the pouch.

5. A sealant resin composition according to claim 1, wherein the linear low density polyethylene (B) is an ethylene-α-olefin copolymer comprising 95 to 99 mol % of ethylene and 1 to 5 mol % of α-olefin having 3 to 12 carbon atoms.

6. A sealant resin composition according to claim 1, wherein a weight-average molecular weight (Mw)/a number-average molecular weight (Mn) of the linear low density polyethylene (B) is 1.5 to 3.5.

7. A sealant resin composition according to claim 1, wherein the composition is a resin composition from which a film may be molded that has a film impact strength at −5° C. Of not less than 1,200 kg.cm/cm, a haze of not more than 5.5% after being subjected to boiling treatment at 120° C. for 1,800 seconds, a tensile strength at break at −20° C. of not less than 20N/15 mm and a tensile elongation at break at −20° C. of not less than 200%.

8. A sealant film according to claim 2, wherein the film has a film impact strength at −5° C. of not less than 1,200 kg.cm/cm, a haze of not more than 5.5% after being subjected to boiling treatment at 120° C. for 1,800 seconds, a tensile strength at break at −20° C. of not less than 20N/15 mm and a tensile elongation at break at −20° C. of not less than 200%.

9. The sealant resin composition according to claim 1 wherein the high density polyethylene (A) has a density of 0.950 to 0.960 g/cm$^3$ and a melt flow rate of 1.0 to 6.0 g/10 minutes, as measured at 190° C. and a load of 2.16 Kg, according to ASTM D-1238.

10. The sealant resin composition according to claim 1, comprising, based on 100 parts by weight of (A) and (B), 60 to 90 parts (A) and 10 to 40 parts (B).

11. The sealant resin composition according to claim 1, comprising, based on 100 parts by weight of (A) and (B), 60 to 85 parts (A) and 15 to 40 parts (B).

* * * * *